(12) United States Patent
Sambaraju et al.

(10) Patent No.: US 10,797,797 B2
(45) Date of Patent: Oct. 6, 2020

(54) FIBER OPTIC EXTENDER

(71) Applicant: NEXANS, Paris (FR)

(72) Inventors: Rakesh Sambaraju, Downingtown, PA (US); Michael Good, New Holland, PA (US)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 15/475,904

(22) Filed: Mar. 31, 2017

(65) Prior Publication Data

US 2018/0287702 A1 Oct. 4, 2018

(51) Int. Cl.
| | |
|---|---|
| *H04B 10/00* | (2013.01) |
| *H04B 10/2581* | (2013.01) |
| *G02B 6/44* | (2006.01) |
| *G02B 6/42* | (2006.01) |
| *H04B 10/25* | (2013.01) |
| *H04B 10/079* | (2013.01) |
| *H04B 10/40* | (2013.01) |
| *H04Q 11/00* | (2006.01) |

(52) U.S. Cl.
CPC ....... *H04B 10/2581* (2013.01); *G02B 6/4293* (2013.01); *G02B 6/4453* (2013.01); *H04B 10/0795* (2013.01); *H04B 10/25891* (2020.05); *H04B 10/40* (2013.01); *H04Q 11/0005* (2013.01)

(58) Field of Classification Search
USPC .................................................. 398/173–181
See application file for complete search history.

(56) References Cited

U.S. PATENT DOCUMENTS

| | | | | |
|---|---|---|---|---|
| 5,038,406 A | * | 8/1991 | Titterton | H04B 10/11 342/45 |
| 5,642,219 A | * | 6/1997 | Ogiya | H01S 3/06704 359/341.1 |
| 6,215,582 B1 | * | 4/2001 | Sudo | G02B 6/12002 385/134 |
| 6,321,017 B1 | * | 11/2001 | Janus | G02B 6/4478 385/134 |
| 6,381,065 B1 | * | 4/2002 | Homsey | H01S 3/094003 359/341.31 |
| 6,381,394 B1 | * | 4/2002 | Cabrera | G02B 6/4448 359/341.1 |
| 6,504,989 B1 | | 1/2003 | Gooding | |
| 6,534,712 B1 | * | 3/2003 | Pitrone | G02B 6/4428 174/70 S |
| 6,687,130 B2 | * | 2/2004 | Adams, Sr. | H05K 7/1404 361/174 |

(Continued)

OTHER PUBLICATIONS

European Search Report dated Aug. 27, 2018.

*Primary Examiner* — Agustin Bello
(74) *Attorney, Agent, or Firm* — Sofer & Haroun, LLP (57) ABSTRACT

The present arrangement replaces passive components of a multi-mode fiber optic channel, such as a typical prior art cassette (i.e. connectors & short lengths of fibers) with active cassettes that have components therein that receive the optical signal from a first transmitting transceiver, convert the signal to an electrical signal, route that signal appropriately within the cassette and re-send an optical signal out from the opposite of the cassette into the infrastructure harness. This results in a localized optical signal boost at a mid-channel location.

8 Claims, 10 Drawing Sheets

(56) References Cited

U.S. PATENT DOCUMENTS

| | | | | |
|---|---|---|---|---|
| 6,707,670 B2* | 3/2004 | Seal | F16B 2/14 | 174/535 |
| 6,788,870 B1* | 9/2004 | Maxham | G02B 6/4448 | 385/135 |
| 6,819,875 B2* | 11/2004 | Touma | H04B 10/506 | 359/337 |
| 7,099,595 B2* | 8/2006 | Touma | H04B 10/506 | 359/337 |
| 7,120,362 B2* | 10/2006 | Pedersen | G02B 6/4428 | 398/104 |
| 7,149,433 B2* | 12/2006 | Grubb | H04B 10/291 | 398/175 |
| 7,186,033 B2* | 3/2007 | Deans | H04B 10/294 | 359/333 |
| 7,196,838 B2* | 3/2007 | Adams, Sr. | G02B 6/4442 | 359/333 |
| 7,295,783 B2* | 11/2007 | Singh | B82Y 20/00 | 398/164 |
| 7,366,416 B2* | 4/2008 | Ramachandran | H04B 10/272 | 385/24 |
| 7,567,758 B2* | 7/2009 | Aronson | H04B 10/40 | 370/217 |
| 7,593,640 B2* | 9/2009 | Hamoir | H04B 10/077 | 398/173 |
| 7,606,500 B2* | 10/2009 | Hofmeister | H04J 14/0201 | 398/135 |
| 8,009,959 B2* | 8/2011 | Barnes | G02B 6/0365 | 385/14 |
| 8,139,951 B2* | 3/2012 | Samartsev | H04B 10/07955 | 398/157 |
| 8,270,845 B2* | 9/2012 | Cheung | H04B 10/2581 | 359/618 |
| 8,340,526 B2* | 12/2012 | Camilli | H04B 10/272 | 398/104 |
| 8,422,847 B2* | 4/2013 | Kowalczyk | G02B 6/4453 | 385/134 |
| 8,588,561 B2* | 11/2013 | Zbinden | G02B 6/4232 | 385/14 |
| 9,020,364 B2* | 4/2015 | Xie | H04B 10/6161 | 398/202 |
| 9,112,614 B2* | 8/2015 | Randel | H04B 10/611 | |
| 9,448,377 B2* | 9/2016 | Kowalczyk | G02B 6/4453 | |
| 2003/0072062 A1* | 4/2003 | Pedersen | G02B 6/4428 | 398/181 |
| 2003/0072063 A1* | 4/2003 | Adams, Sr. | G02B 6/4442 | 398/173 |
| 2005/0244165 A1 | 11/2005 | Hofmeister | | |
| 2005/0249505 A1* | 11/2005 | Manderscheid | H04B 10/077 | 398/177 |
| 2005/0259995 A1* | 11/2005 | Schrodinger | H04B 10/504 | 398/182 |
| 2007/0058989 A1* | 3/2007 | Kaku | H04B 10/0799 | 398/209 |
| 2009/0214158 A1* | 8/2009 | Lee | G02B 6/43 | 385/14 |
| 2010/0150572 A1* | 6/2010 | Lee | G06F 13/409 | 398/141 |
| 2011/0116807 A1* | 5/2011 | Park | H04B 10/801 | 398/164 |
| 2012/0087656 A1* | 4/2012 | Rourke | H04L 12/40045 | 398/43 |
| 2012/0328304 A1* | 12/2012 | Ikushima | H04B 10/07 | 398/140 |
| 2013/0308915 A1* | 11/2013 | Buff | G02B 6/4452 | 385/135 |
| 2013/0308916 A1* | 11/2013 | Buff | G02B 6/4452 | 385/135 |
| 2014/0056568 A1* | 2/2014 | Kowalczyk | G02B 6/4453 | 385/135 |
| 2014/0186023 A1 | 7/2014 | Louderback | | |
| 2015/0055925 A1* | 2/2015 | Kowalczyk | G02B 6/4453 | 385/135 |
| 2015/0333830 A1* | 11/2015 | Chen | H04B 10/2581 | 398/178 |
| 2015/0372764 A1* | 12/2015 | Kaneda | H04B 10/616 | 398/115 |
| 2016/0020911 A1* | 1/2016 | Sipes, Jr. | H04B 10/808 | 398/16 |
| 2016/0266340 A1* | 9/2016 | Zhang | G02B 6/32 | |
| 2017/0082816 A1* | 3/2017 | Kowalczyk | G02B 6/4453 | |

* cited by examiner

FIBER OPTIC EXTENDER

BACKGROUND

Field of the Invention

The present arrangement is directed to optical fiber cassettes. More particularly, the present arrangement is directed to an active fiber cassette that mitigates transmission impairments.

Description of Related Art

In the field of fiber optic equipment, the increasing data rates of optical systems designed to transmit data in multi-mode fibers is causing a significant decrease in the allowable "link loss budget." The link loss budget is the maximum optical loss in dB (decibels) allowable within a fiber optic communication channel due to the optical losses incurred as the signal passes over the cables and through the various connection points in the channel, such as at connector interfaces.

Simultaneously, the use of multi-fiber connectors such as MPO (Multi-fiber Push-On) connectors is increasing the amount of connector loss in the communication channel when compared to LC (Lucent Connector) connectivity used in previous systems, owing to the increased physical complexity of MPO type connectors. For example, typical losses associated with mating two MPO connectors together is 0.5 dB, versus the mating of two LC connectors which typically results in 0.2 dB of loss.

In combination, these two loss factors, i.e. using increase data rates and MPO connections, are decreasing the maximum channel length of multimode fiber optic systems and/or reducing the number of mated-pairs (connectors) that can be used in the channel. This makes multimode systems less attractive in some marketplaces.

Currently, multimode fiber optic systems rely on the signal strength generated at transceivers at either end of the signal path to be sufficient so that the communication channel complies with industry standards for the link loss budget. In a standard fiber optic telecommunication network, optical transceivers are used to connect servers and switches together.

Figure 1:
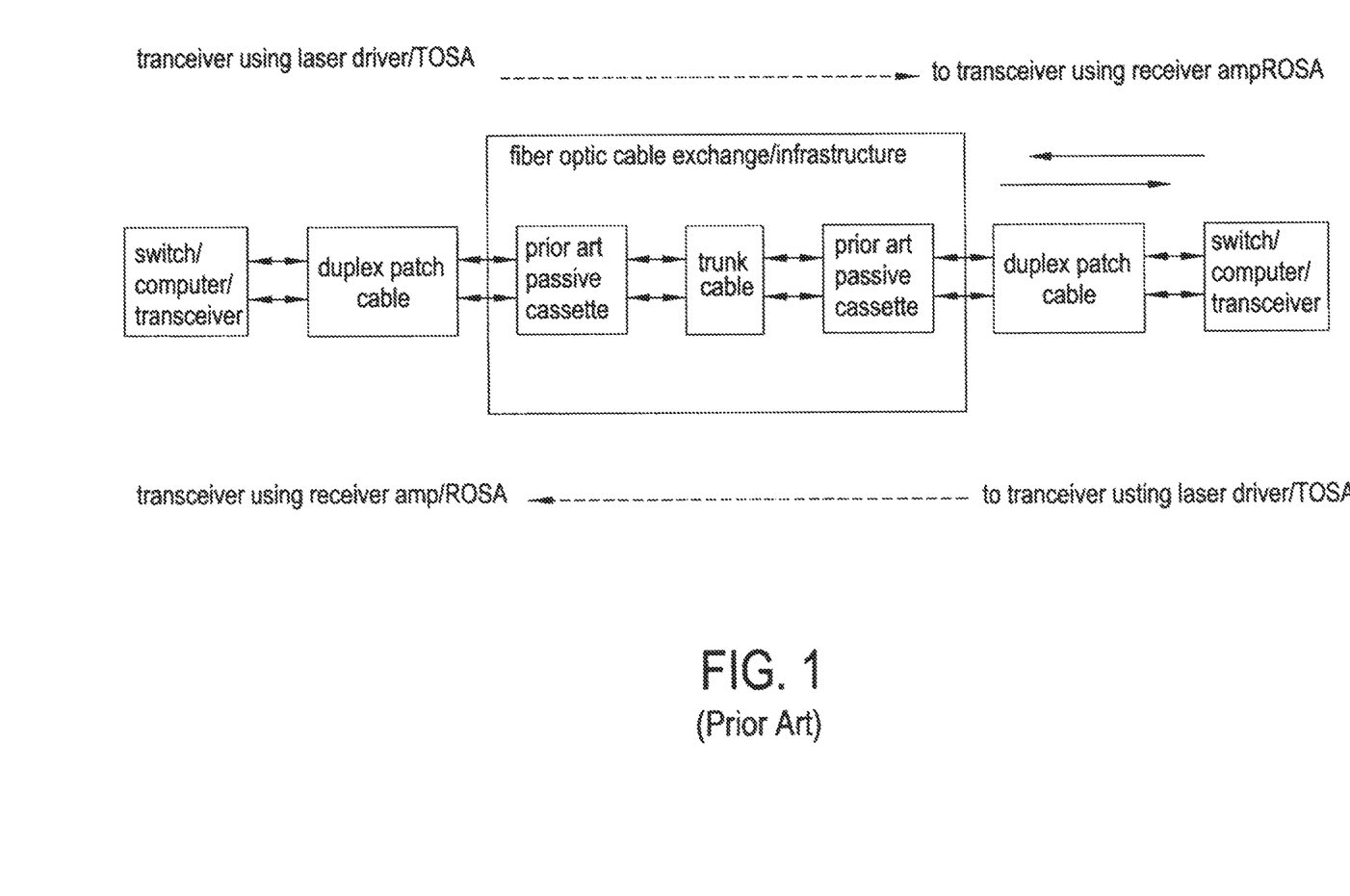
FIG. 1 illustrates a prior art optical system showing transceivers, passive cassettes and optical infrastructure.

FIG. 1 shows a basic fiber optic arrangement with a first transmitter, such as an electronic server or component wishing to transmit optical data to a second receiver in a first direction. Bi-directional communications can occur in the opposite direction, often from the same device/server, where each component acts as both a receiver and transmitter (transceiver). Such communications often pass through an optical infrastructure, particularly in the case of large fiber optic arrangements (e.g. server farms). To facilitate organization and connection/re-connection of fiber cables, fiber cassettes are often implemented in the infrastructure at the location indicated in FIG. 1.

Prior art transceivers utilize normal optical transmitter and receiver equipment. For example, in one possible typical transceiver as shown in prior art FIG. 2, an optical transceiver converts an electrical signal coming from a host (server or switch) via a Physical Media Attachment (PMA) into an optical signal, in the transmit direction, and vice-versa in the receive direction. In this respect, the transceiver passes the electrical signals coming from the host through signal conditioning such as Clock and Data Recovery (CDR) before amplification in a laser driver, with the CDR modulating the optical signal. The modulation of the optical signal can be achieved by modulating the LASER current directly, or by using an external Electro-Optical Modulator. The optical signal with the modulated data is coupled into the fiber via TOSA (Transmitting Optical Sub-Assemblies) coupled to a Media Dependent Interface (MDI). Depending on the speed and protocol of the transceiver, the MDI can either be a multi-fiber connector like MPO or a simple duplex connectivity.

Figure 2:
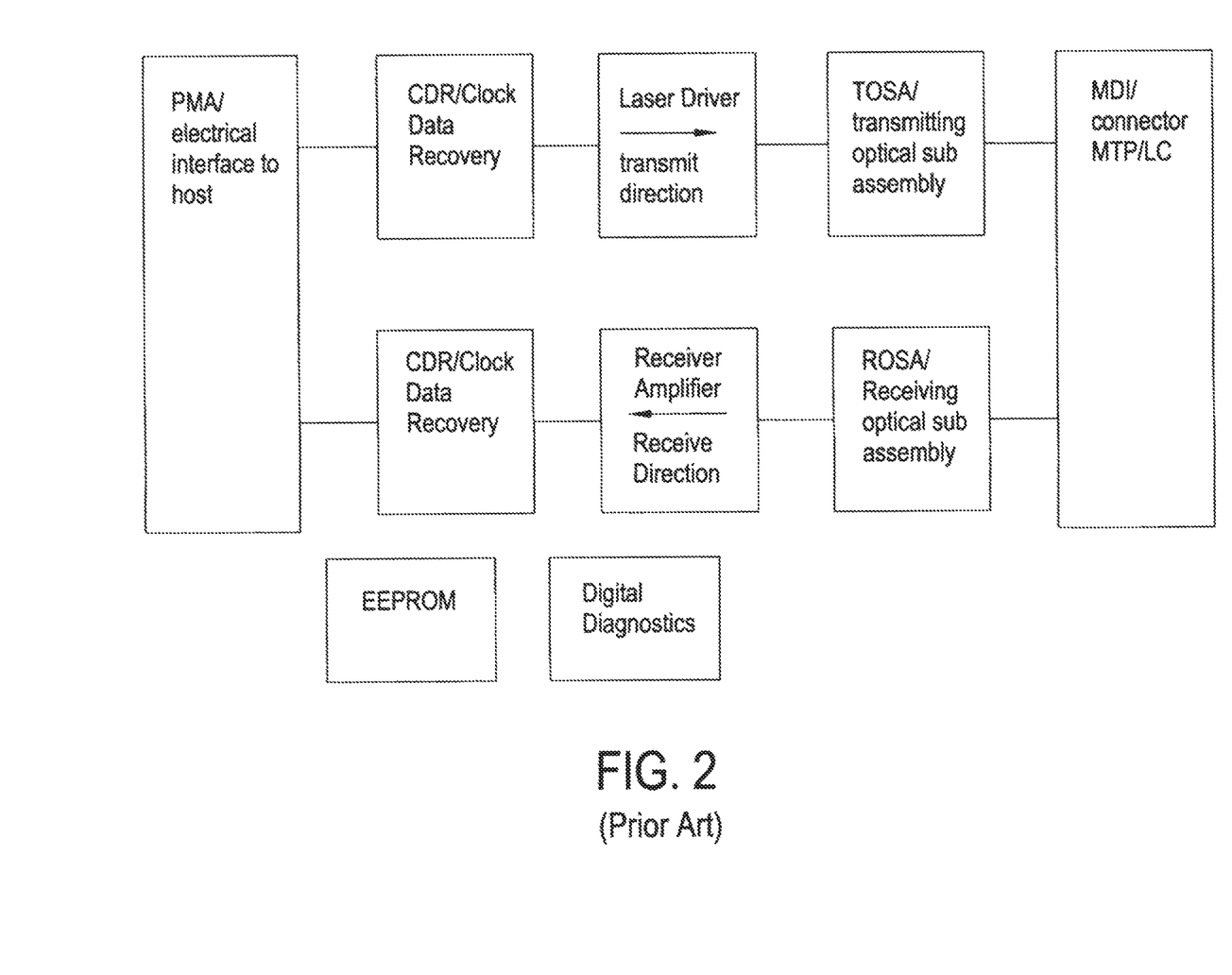
FIG. 2 shows a prior art transceiver and its components used in a multimode fiber optic system.

In the receive direction a different destination transceiver receives an optical signal at its MDI connection. The optical signal after fiber propagation is received at this transceiver located at the end of the channel where it is converted back to an electrical signal using a photo-diode ROSA (Receiving optical sub-assembly). The photo-detected signals are brought to the appropriate power levels using a receiver amplifier. To further compensate for the excessive transmission and dispersion penalties, a clock and data recovery circuit may be used. The re-conditioned electrical signals are sent to the host/server via the PMA.

For an accurate functioning of the transceiver, digital diagnostics can be implemented which monitor the components' functionality in real-time. The digital diagnostics monitoring measurements corresponding for example to threshold levels are stored an EEPROM (Electrically Erasable Programmable Read Only Memory), the output of which is read by the host/server.

Moreover, it is noted that that transceivers and their respective components are media dependent and differ depending on whether a multimode or single mode fiber is used. For example, one implementation of a multimode transceiver may use a VCSEL (Vertical-cavity surface-emitting laser) as a light source, whereas in a single mode implementation, a DFB (Distributed Feedback Laser) or Fabry-Perot Laser may be used in the transceiver. In both cases, the initial light source after conversion is a laser.

Employing the above described exemplary transceivers, prior art solutions, to prevent exceeding the link loss budget in longer multimode fiber optic systems focused on decreasing connection losses in the cables and connectivity of the system by more tightly specifying the physical tolerances of the system connectors. In other words, the prior art focused on the reducing loss at the connection points through more precise construction of the connecting components. However, this prior art solution eventually leads to a case of diminishing returns and fails to completely solve the problems of maximum channel length and limited numbers of mated-pairs (connectors) per channel because there is a limit on the physical precision with which such components, given their small size, can be constructed.

Figure 3:
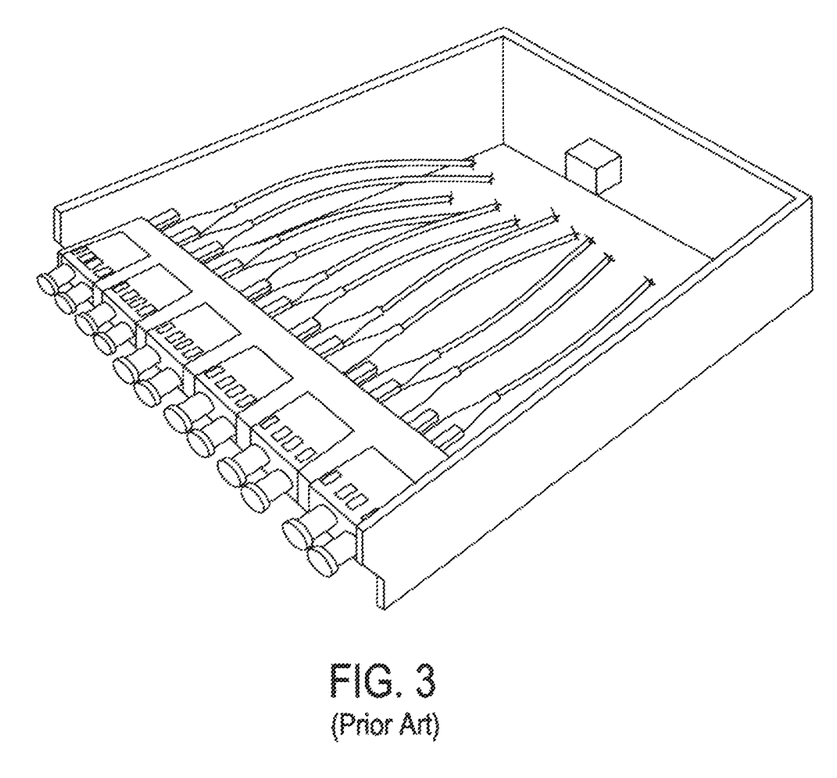
FIG. 3 is an image of a prior art MPO cassette.

It is further noted that many data center cabling designs rely on cassette-based connectivity for connection across trunk cables at fiber optic infrastructure installations. Cassette-based connectivity simply refers to using cassettes or small cartridges to organize physical optical channel connections at a optical infrastructure exchange point or trunk connection. FIG. 3 is a image of a prior art passive cassette with MPO connectors.

Many channels would ordinarily have two such cassettes in one channel, one on either side of the trunk cable connection. These cassettes allow for more flexible and convenient connectivity arrangements (or changes thereto) at the infrastructure installations and otherwise provide more optical channel connectivity options, but the tradeoff with using such components is that they are subject to higher levels of loss due to the fact that the cassettes are simply smaller fiber harnesses in a box (e.g. each having two connections therein). The industry so far has adopted the use of such cassettes because the connection options and ease of use are valuable, but the added signal strength losses these fiber cassette connection scenarios causes because of their two mated-pairs has not been adequately addressed and remains a limit on the length of optical channels that pass through such cassettes.

OBJECTS AND SUMMARY

The present arrangement implements a new component in the multimode fiber optic system, replacing the prior art passive devices ("fiber cassettes") with "active cassettes" that mitigate transmission impairments caused by cables & connectors that accumulate after traveling through numerous concatenated cabling segments. This is accomplished by replacing the passive components of a multi-mode fiber optic channel such as a typical prior art cassette (i.e. connectors & short lengths of fibers) with active cassettes that have components therein that receive the optical signal from a first transmitting transceiver, convert the signal to an electrical signal, route that signal appropriately within the cassette and re-send an optical signal out from the opposite of the cassette into the infrastructure harness. This results at a localized optical signal boost at a mid-channel location.

For example, one embodiment of the present arrangement can be most easily thought of as employing one or more active cassettes, each of which would employ essentially the components of two transceivers therein, with their electrical sides facing each other and their optical sides facing outwards towards the remainder of the channel in which they are located.

Thus, within each "active cassette," one set of transceiver components would function to convert incoming optical signals to electrical signal and the other set of transceiver components would function to convert the signal back from electrical to outputting optical, all within a fiber cassette. This boosts the optical signal at a point in the middle of an optical channel between the primary transceivers to make up for or offset signal losses caused by the physical connections within the channel. Previously, such cassettes were simply passive connection points used for their organization advantages but contributing to the link loss budget as opposed to actively countering signal losses caused by connection points. In one arrangement such transceiver components within the active cassettes could be SFP+ (Small Form-factor Pluggable) or QSFP+ (Quad-Small Form-factor Pluggable) connected back to back in the cassette. Plugable transceivers such as SFP+, QSFP+, etc., are typically found in switches, servers, and, routers that operate at the higher levels of the Open Systems Interconnection (OSI) model, but the active cassette would operate at a lower level, such as Layer 1. In these additional active cassettes employed in the middle of a fiber optic channel, the transceiver components therein may include fewer of the components that are typically found in a primary transceiver in order to reduce cost and complexity. For example, an EEPROM (Electrically Erasable Programmable Read-Only Memory) and digital diagnostics module normally included in a primary transceiver may not be included in the additional transceivers/active cassettes, but other management capability may still be included. Never the less, in accordance with some embodiments, such components used in the active cassettes are within the contemplation of the present arrangement in some instances, possibly with a wi-fi or wireless antenna for connecting some or all of the diagnostic data to an outside monitoring arrangement.

In another embodiment, the present arrangement of active cassette may have the same type of connectors on both sides or it may have for example a multi-fiber connector such as an MPO connector on one end, and corresponding number of duplex-LC connectors on the other. As an example, if one end of the active cassette has a 12-fiber MPO, the other end may have six (6) duplex-LCs, or if one end has a 24-fiber MPO, the other end may have twelve (12) duplex-LCs. This hybrid arrangement may be used to break-out a higher speed port into multiple lower speed ports.

In another embodiment, the present arrangement of active cassette may include electrical and optical circuitry to tap either electrical or optical signals for network monitoring. "Taps" are known arrangements in the art where an optical signal is taped or split with a small amount of the signal diverted to a channel monitor, usually monitoring for channel security. The taped signal monitoring devices usually have an optical input and the taped portion of the signal causes some signal strength loss that normally needs to be accounted for in the link loss budget. For example, a tap may be applied to a portion of the fiber, possibly by scrapping some of the optical cladding and applying an optical detector to the fiber. This allows the tap to direct a monitored optical signal to a device for analysis, but the tapping process and related connection to the optical fiber results in some optical signal loss.

In one possible arrangement, the present active cassette may additionally have a monitoring tap located prior to the optical signal being initially converted to electrical within the active cassette where some of the optical signal is diverted to a tap monitoring device (located for example near the optical infrastructure). In another possible arrangement, the electrical signal passing between the two sides of the active cassette can be sent to a separate electrical to optical converter so that it can be sent out as an optical signal to the monitoring device. In either case, in the prior art, using only passive cassettes, such a tap had to divert optical signals (there are no electrical signals in a prior art passive cassette) and would cause additional loss in the channel. Using the present arrangement, because of the boosting effect to the optical signal or because only an electrical signal is being tapped for monitoring, a monitoring tap located at the present active cassette can be added to optical channels with no related loss to the optical signal strength in the channel.

In another embodiment, the present arrangement of active cassettes may be powered via the power being transmitted in a tandem optical/electrical cable and subsequently passed to the components of the active cassette via alignment pins present in one or more connected multi-fiber-push on (MPO) connectors. This eliminates the need for an to independent power source for the optical infrastructure racks for the active cassettes, where such optical infrastructure racks traditionally did not need such external power as they only contained prior art passive cassettes for fiber optic connectivity.

BRIEF DESCRIPTION OF THE DRAWINGS

The present invention can be best understood through the following description and accompanying drawings, wherein.

DETAILED DESCRIPTION

Figure 4:
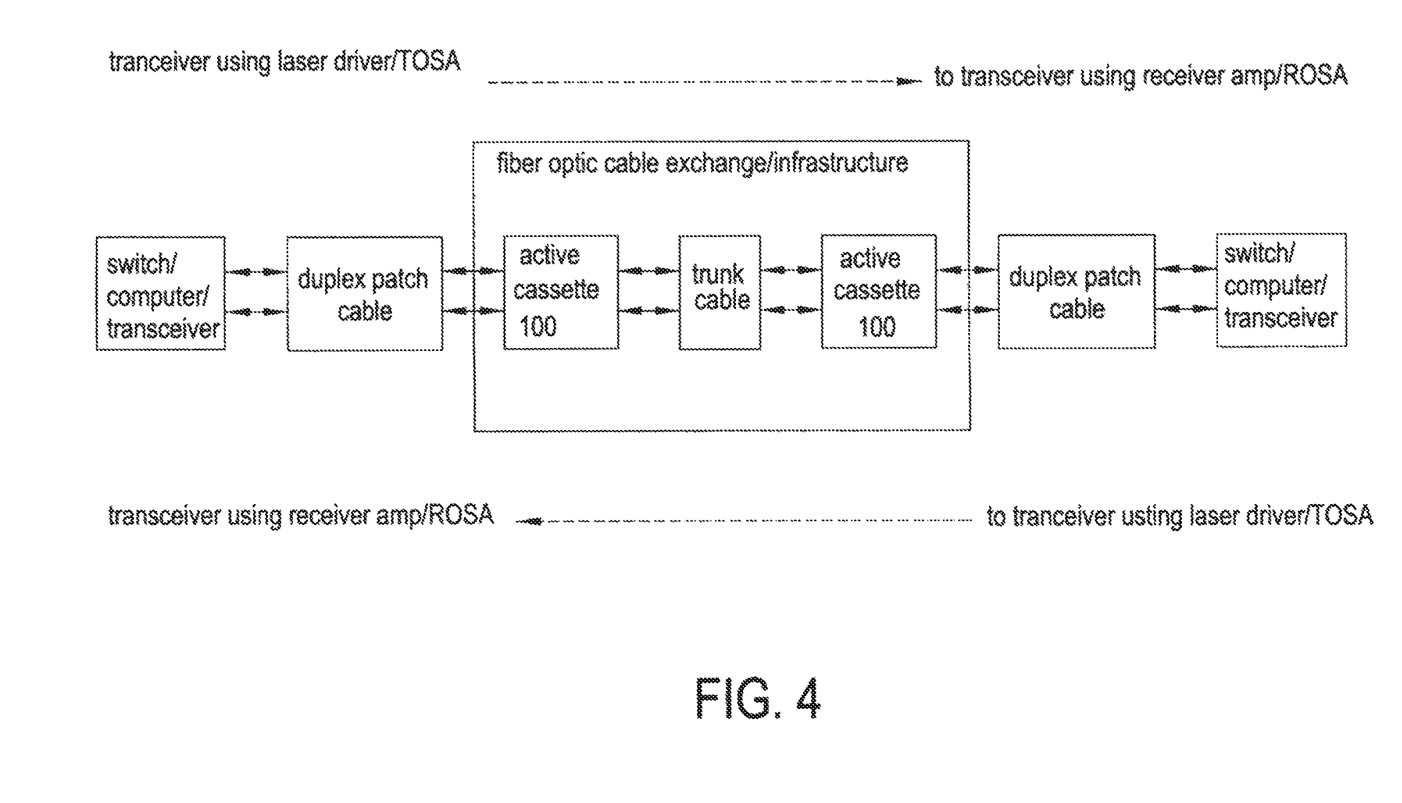
FIG. 4 illustrates a multimode fiber optic system implementing active cassettes, in accordance with one embodiment.

The present arrangement, illustrated in FIG. 4 shows a multimode fiber optic system, employing an active cassette 100 in place of the prior art passive cassettes as explained in more detail below. In FIG. 4, active cassettes 100 are deployed in a fiber optic communication channel between two switches/transceivers, one acting as a transmitter and the other as a receiver (end-to-end).

In one embodiment, active cassette 100 is similarly sized to the prior art passive cassettes, and is otherwise a modular device that is placed into a fiber optic frame/chassis that would hold one or more active cassettes. Normal fiber optic chassis are suitable for placement in a 19" rack and its height measured in rack mount units (1U, 2U, etc. . . . ). The physical dimensions of active cassette 100 may be ¼, ¼, ⅓ of the chassis height and width. In one example the length of active cassette would be 4 inches to 12 inches.

Typical multimode fiber optic systems/channels employ two servers/switches and duplex patch cables that connect the switches to the optical cabling infrastructure. The cabling infrastructure usually includes two connectivity cassettes and a fiber optic trunk cable therebetween, all of which is shown in FIG. 4. The active cassettes are explained in more detail below, including their internal components.

When an optical network is physically reconfigured, it is typically the patch cords and switches or other networking equipment at the ends of the communication channel that are repositioned with the infrastructure remaining in place (such as those shown at the ends of optical pathway in FIG. 4). Prior art passive cassettes are typically used in such an instance to provide for flexibility in the logical reconfiguration of the network, which refers to changing or creating new communication paths between equipment that has not necessarily been moved physically. Thus the job of the patch cords is to provide both physical and logical reconfiguration flexibility, while the prior art passive cassettes and trunk cable are generally designed to provide logical reconfiguration flexibility.

In prior art solutions, the link loss budget would have included the optical loss accumulated through all of the components between the two switches shown in FIG. 1. Given the fact that passive cassettes each feature two connectors (see e.g. prior art FIG. 3), they contribute relatively large optical losses to the overall link loss budget compared to the other segments of the communication channel.

In the present arrangement as shown in FIG. 4, two active cassettes 100 are positioned within the cabling infrastructure in place of the prior art passive cassettes. The use of active cassettes 100 in a multimode fiber optic system solves the problem of optical signal losses caused by the physical connections within prior art passive cassettes by not only providing the required (same) channel connectivity flexibility but also regenerating or boosting the optical signal which allows for the entire system's link loss budget to be available in each segment between a switch and an active cassette as well as between active cassettes. In other words, in FIG. 4, what was previously the link-loss budget for an entire pathway/channel in FIG. 1 is not available just for the connections between the server/transmitter and the first active cassette 100, but also for the segment of the pathway between active cassettes 100, as well as the segment from the second active cassette to the receiver.

This allows for much longer distances between switches/hosts, and even more connected segments for flexibility or added physical channel length or both. And, by powering one or more of active cassettes 100 locally and passing power through the alignment pins (discussed in more detail below) of connected MPO connectors to other active cassettes 100, the need to associated power distribution equipment is mostly eliminated along the optical cable infrastructure.

Figure 5A:
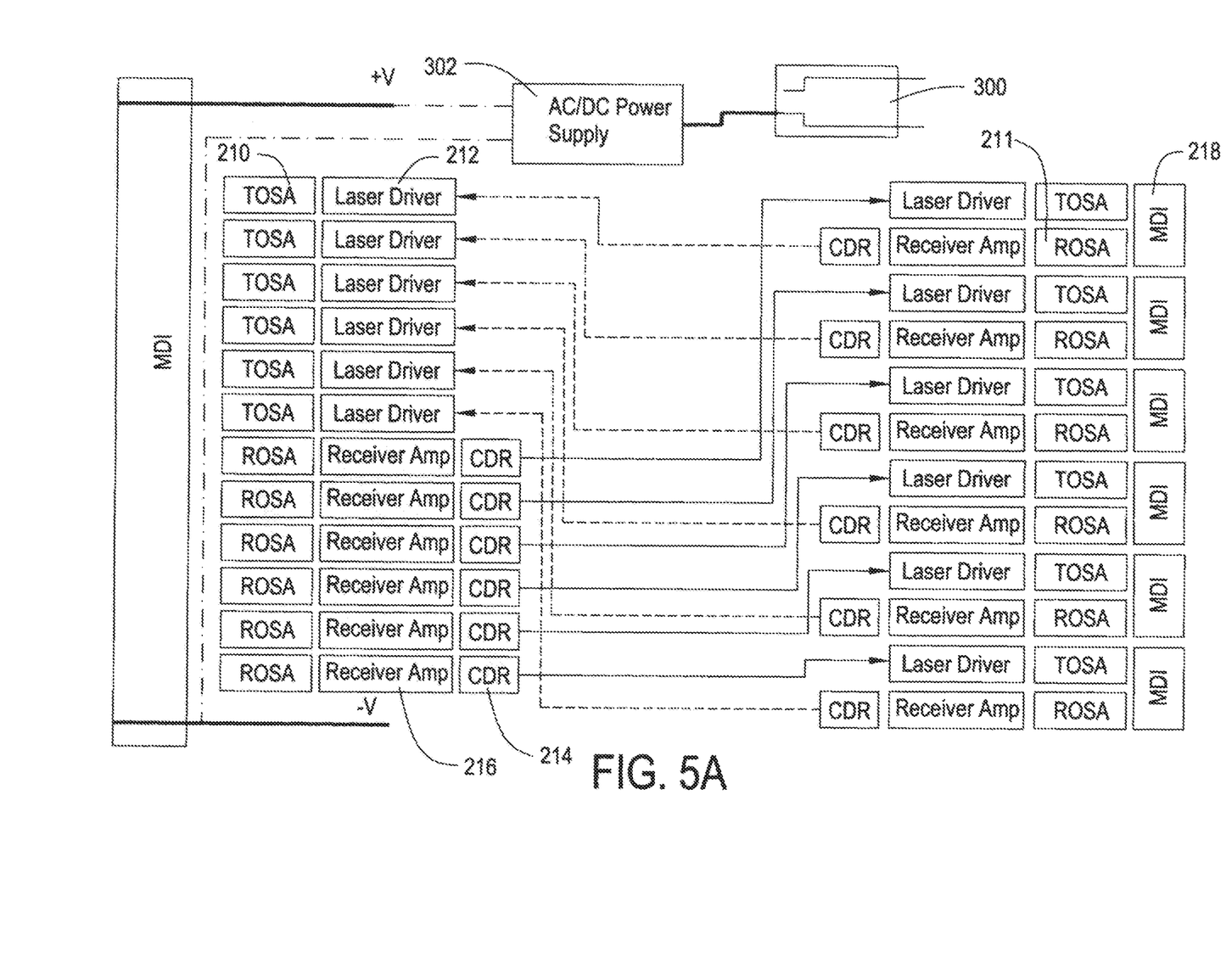
FIGS. 5A & 5B are block diagrams of the components in an active cassette, in accordance with two embodiments.
Figure 5B:
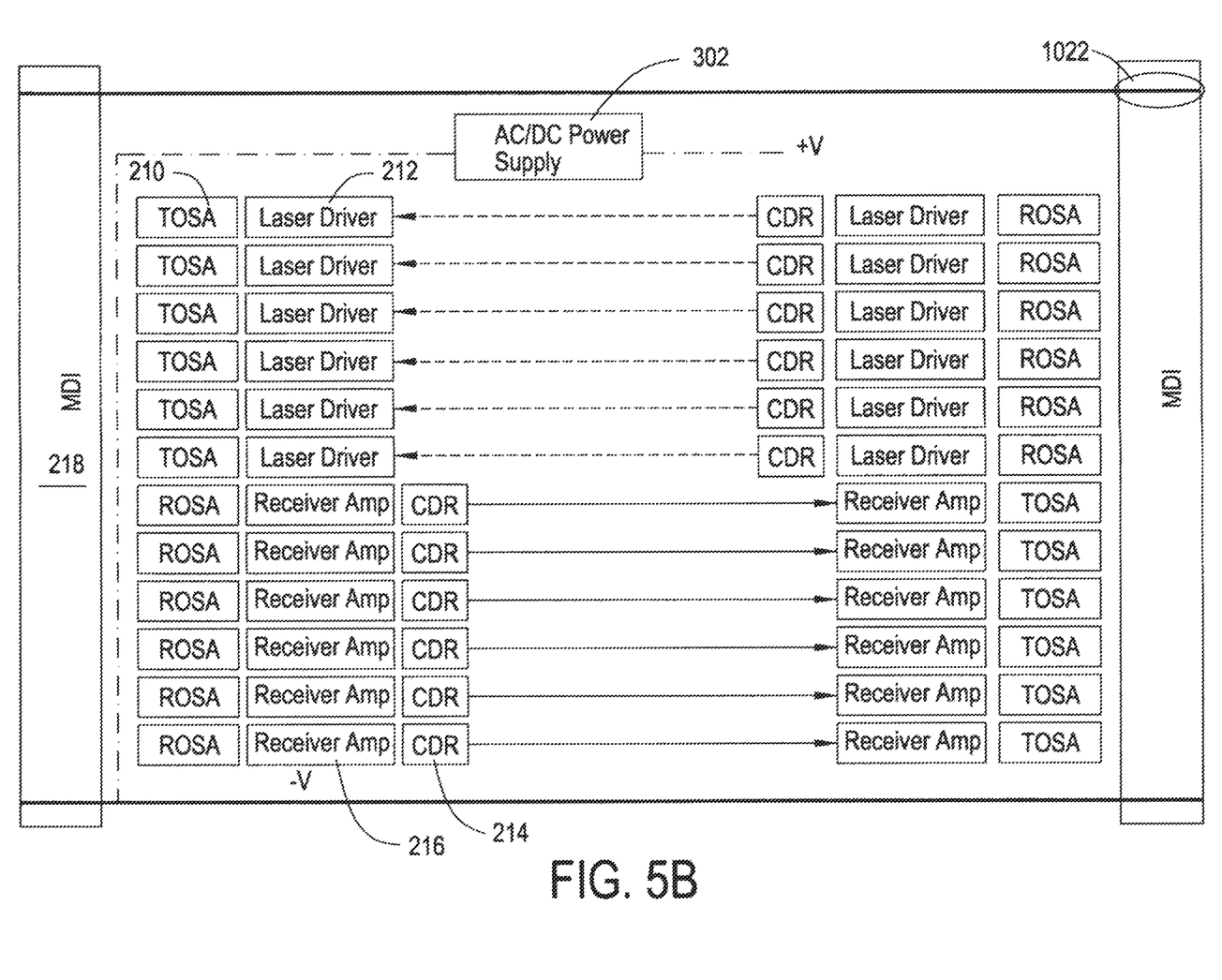

Turning to the internal structure of active cassette 100, in accordance with one embodiment as shown in FIGS. 5A and 5B, active cassettes 100 normally includes typically features of a transceiver including TOSA/ROSA 210/211, laser drivers 212, CDRs 214, receiver amplifiers 216 and MD's 218, each of which mirror the function such components would have in a normal optical transceiver. Additional components of used in traditional transceivers may be added as desired, such as diagnostic modules (EEPROM) as desired. (not shown)

It is contemplated that such components for cassettes 100 are configured to sufficiently boosting optical signal of any optical channels passing there through. As noted in the summary, and as evident from FIGS. 5A and 5B, the internal components of active cassettes 100 operate as mirroring two optical transceivers with their electrical sides facing each other (CDR-→Laser driver) and their optical sides facing outwards (Laser Driver-→TOSA-→MDI) towards the remainder of the channel (of FIG. 4 in either direction. Active cassettes 100 are two way devices within the structure of FIG. 4 acting as both receivers and transmitters).

The connection lines in FIGS. 5A and 5B show exemplary electrical connections across active cassettes 100 from one side to the other for the various optical channel pathways connector to either side of the cassette. The laser drivers and controls thereof can be used to adjust or boost the optical signals output on the transmitting side of active cassette 100 so as to offset signal strength losses incurred due to physical connections or longer channel length so that the optical signals will remain within the desired link loss budget. Essentially, at each active cassette 100 a slightly diminished optical signal is received (owing to the link loss up to that point) and re-delivered out the other side at full optical strength again.

For example current passive cassettes typically contribute about 0.5 dB of optical signal strength loss to a given optical channel passing there through. The present arrangement using active cassettes 100 could easily be adjusted to have 0 dB of signal strength loss (or even signal strength gain).

Referring to FIG. 4 and FIGS. 5A and 5B, it can be seen that the active cassette 100 operates to boost an optical signal passing through an optical channel by providing mid-channel amplification in place of a passive cassette of the prior art which would have occupied the same location in a traditional optical infrastructure location. In this respect an optical signal passing from left to right in FIG. 4 through an optical channel according to the present arrangement is received at active cassette 100, down converted to an electrical signal and passed across cassette 100 and its internal components (FIGS. 5A and 5B) and then resent as a boosted optical signal, across the trunk cable infrastructure, into the right active cassette 100, again shifted to electrical and back to optical as it passes across the components of the second active cassette 100 and finally out to the right side switch transceiver. In some arrangements only one cassette (of FIG. 4) may be an active cassette 100. In either case, owing to the mid channel boosting of the optical signals by active cassettes 100, the amount of loss experienced at the various connection points (i.e. "link loss") is otherwise mitigated, allowing for longer potential optical channels, and more connectivity options, particularly with multi-mode fibers.

In one embodiment as shown in FIG. 5A, power for cassette 100 is provided via a local power source 300 that connects with an AC/DC power supply unit 302 within active cassette 100. In this arrangement, any internal components of active cassette 100 that require power would receive their power from supply unit 300 that is powered locally at the optical cable infrastructure, such as a standard electrical outlet (e.g. power source 300). The power is converted into a lower voltage AC or DC power signal at power supply 302 and passed through typical electrical connectivity pathways used in optical transceivers.

In another embodiment of the present arrangement, the internal structure of active cassette 100 as shown in FIG. 5B is powered by power that is supplied by guide pins 1022 of an MPO connector attached to cassette 100. In this arrangement, active cassette 100 receives its power from a Power over Ethernet enabled cable, transferred from remote power source 300' that connects with a DC power supply unit 302' within active cassette 100.

In multi-mode optical fibers with MPO terminations, the guide pins that are located in a typical connector may be powered to allow continued power flow through such arrangements across connections as described in more detail below. For example, fiber optic cables may also be outfitted with power as described in U.S. Pat. No. 9,500,815 issued on Nov. 22, 2016, the entirety of which is incorporated by reference.

Figures 6A, 6B:
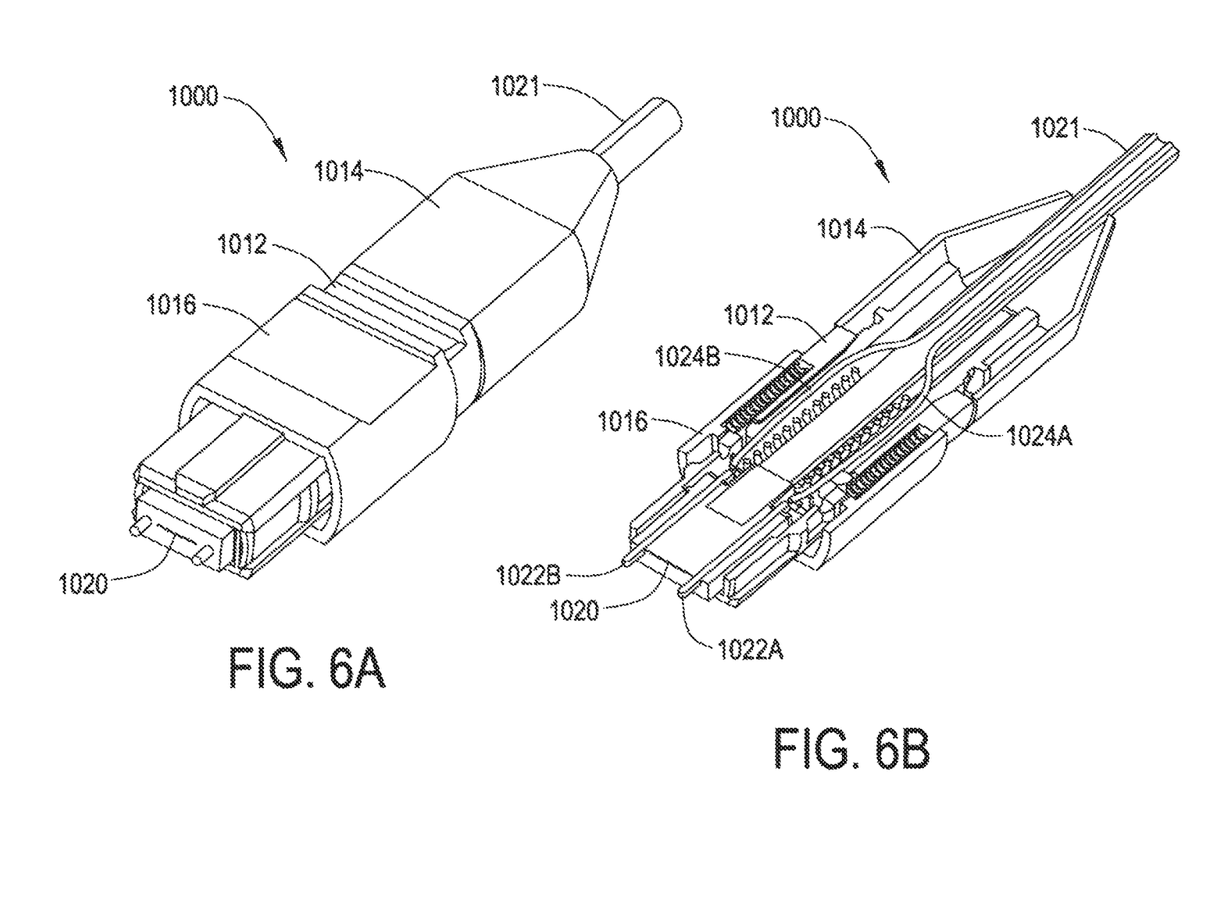
FIGS. 6A-6B show MPO connectors with powered guide pins, according to one embodiment.

In accordance with one embodiment of the present invention, FIGS. 6A-6B illustrate modified MPO (Multiple-fiber Push-On/Pull-Off) type connectors 1000. Connector 1000 has a housing 1002, a strain relief 1004, quick disconnect 1006 and a ferrule 1020 for aligning the fibers from a multi-fiber cable 1021. Two locating pins 1022 are configured to be inserted into locating guide slots on an opposing female MPO type connector to properly align the fibers within connector 1010.

Such an arrangement as described above in conjunction with FIGS. 6A-6B and FIG. 5B, may be used to pass power to DC power supply unit 300 rather than from a local source 302 (such as a close by electrical outlet—e.g. in FIG. 5A). It is noted that other embodiments for powered connector pins are shown in U.S. Pat. No. 9,500,815 which are not detailed in full in this application. Nevertheless each of such embodiments may also be applicable to the powering of active cassettes 100 as desired by the optical channel engineer.

Figure 7:
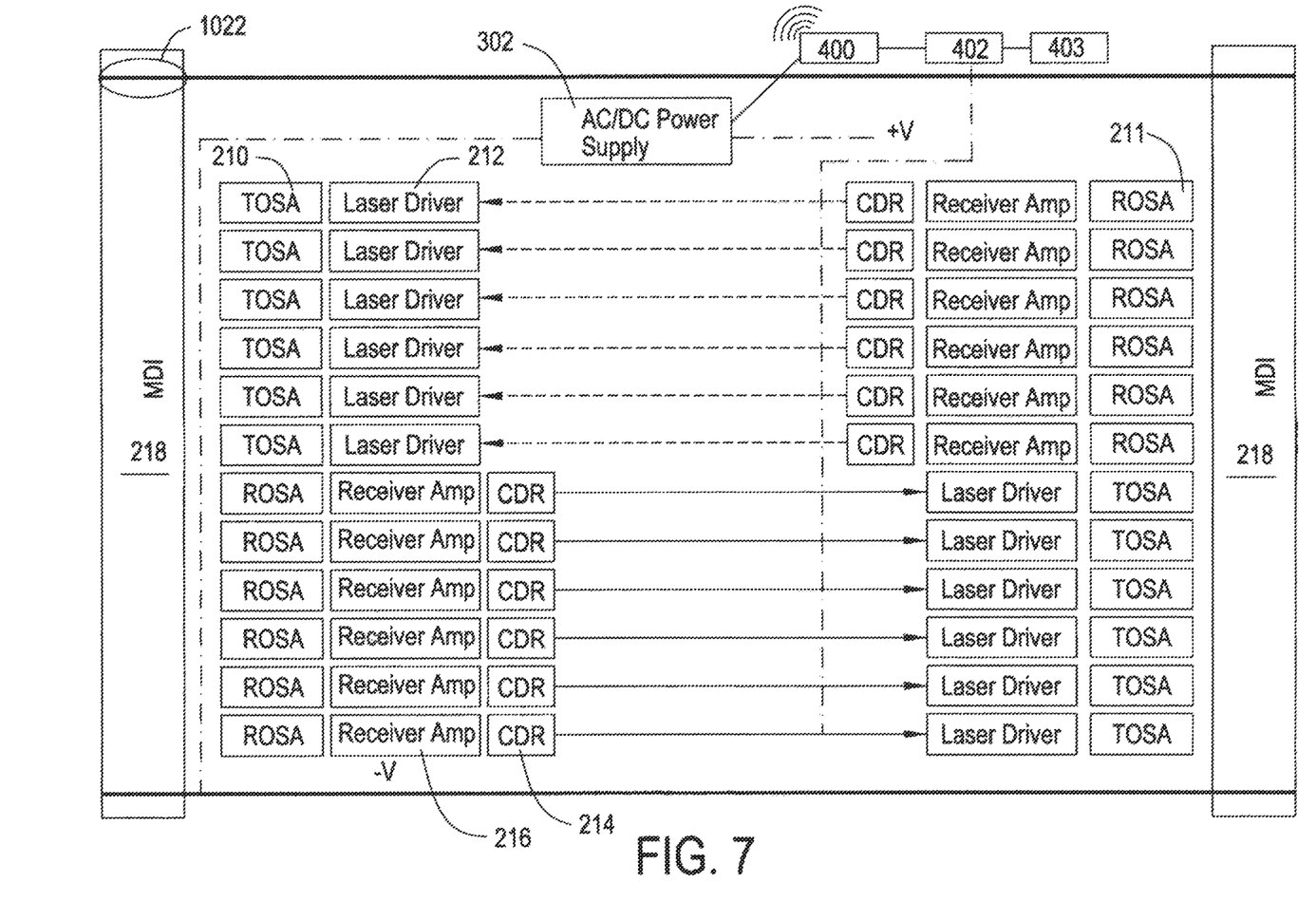
FIG. 7 shows a block diagram of an active cassette with a wireless antenna and diagnostic module, in accordance with one embodiment.

In one embodiment as shown in FIG. 7, active cassette 100 may further contain a wireless antenna 400 and associated circuitry for transmitting control or diagnostic information via a wireless network. For example, diagnostic material may be collected within cassette 100 via an included EEPROM (Electrically Erasable Programmable Read Only Memory) 402. This diagnostic data may be used to monitor the components and to determine if cassette 100 needs replacing similar to the monitoring of existing transceivers. Such an arrangement may be implemented using either local power or guide pin provided power from either FIG. 6A or 6B.

Additionally, when active cassette 100 is powered with power provided through tandem cable MPO guide pins as shown in FIG. 6B, cassette 100 is powered via copper conductors that would span along the length of the various patch cables attached thereto. As such, with this power arrangement there further exists the possibility of using a low frequency electrical signal passed out from the diagnostic equipment 402 to measure the impedance of the connected copper conductors using an impedance element 403 added to normal diagnostic equipment 402. This impedance variation data may be passed from diagnostic equipment 402 so a monitoring station, by line connection (not shown) or possibly wireless antenna 400 and can be used to infer the temperature of the tandem cable as a function of length. This could be used to locate possible "hot spots" or locations where the ambient temperature is hotter than the rest of the environment (leading to decreased equipment life times for example). Such information could provide insight to the data center manager about possible locations of hot spots in the data center or along the tandem cables connected to active cassettes 100.

Figure 8:
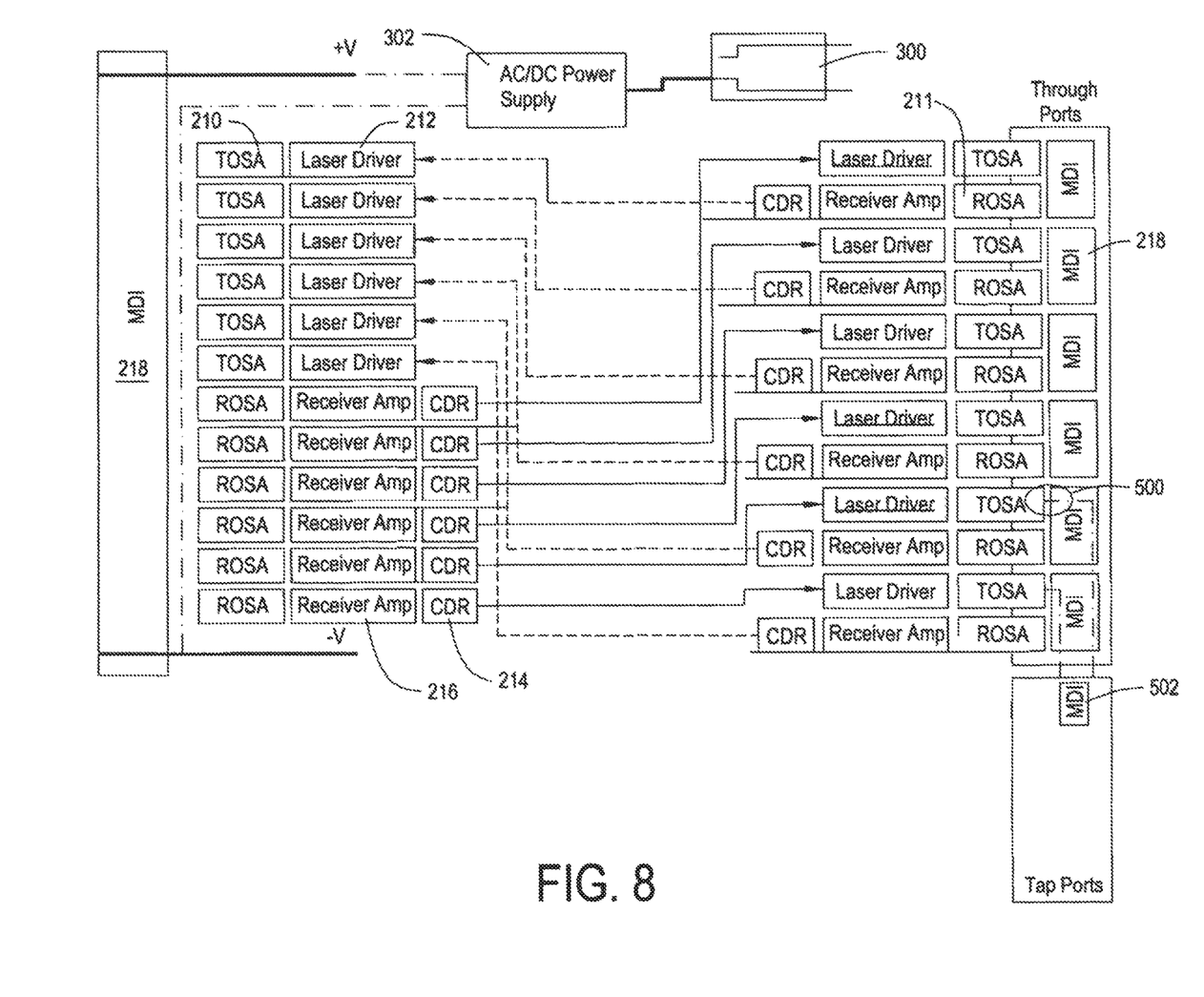
FIG. 8 illustrates an active cassette with monitoring taps, in accordance with one embodiment.
Figure 9:
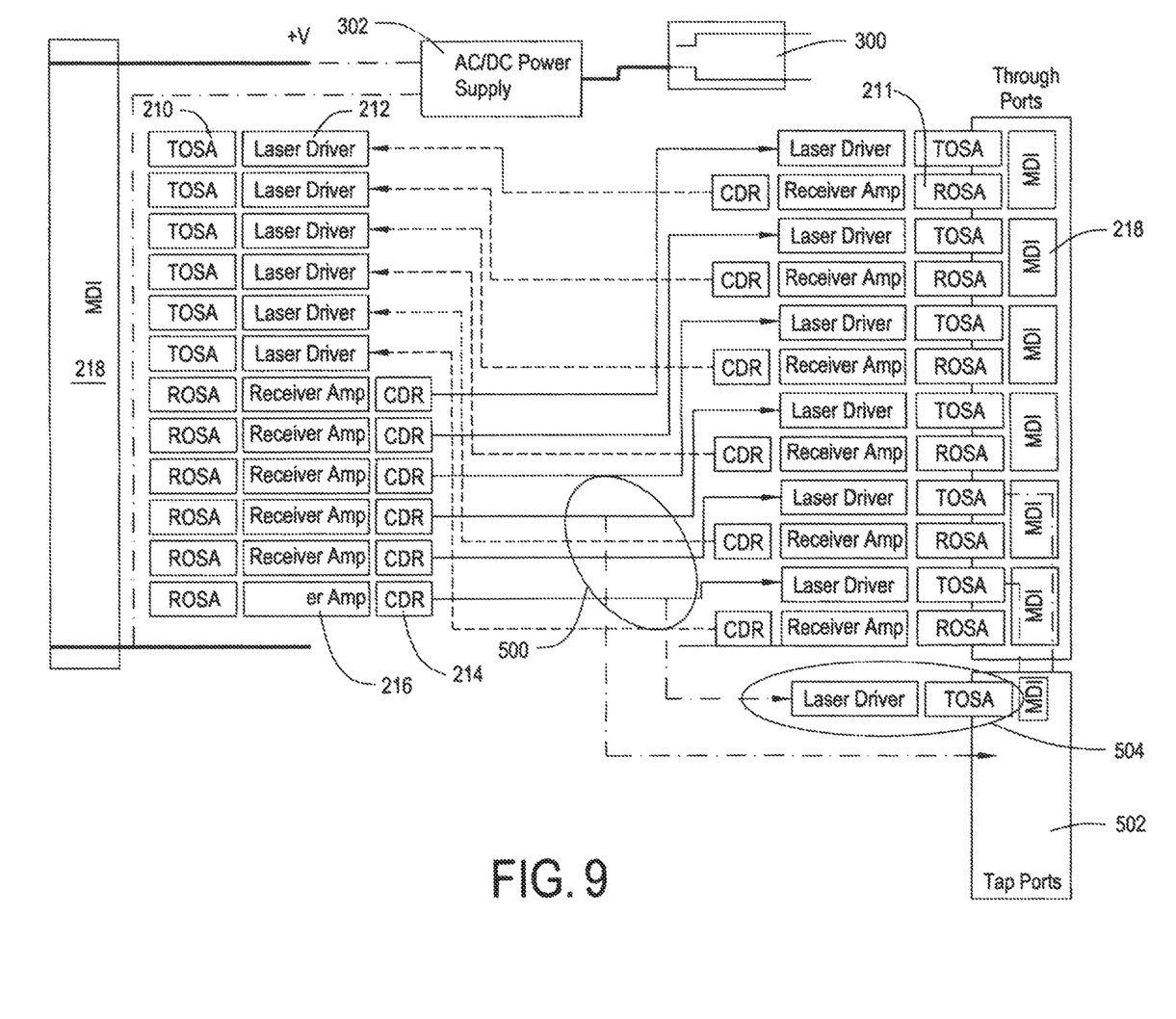
FIG. 9 illustrates an active cassette with monitoring taps, in accordance with one embodiment.

In one embodiment as shown in FIGS. 8 and 9, monitoring tap 500 may be added to active cassette 100. As noted above, taps 500 are used for monitoring for channel security.

In FIG. 8 monitoring tap 500 is arranged after MDI 218 (in the receiving direction) and output to an optical tap diagnostic module 502, located outside of active cassette 100. In FIG. 9, monitoring tap 500 is located after the electronic conversion by a receiver amp 216 to an electronic signal but prior to re-conversion of the signal back to optical by laser driver 212 on the other side of active cassette 100. In this configuration, after the signal is tapped by tap 500 it is converted to an optical signal by optical signal module 504 before being output to/by diagnostic module 502. In both cases as many as all pathways and few as one may be tapped in this manner depending on the requirements.

As noted above, in the prior art using only passive cassettes, such monitoring taps had to divert optical signals (there are no electrical signals in a prior art passive cassette) and as such added to the optical signal strength losses in the channel being taped. Using the present arrangement, because of the boosting effect to the optical signal or because only an electrical signal is being tapped for monitoring, monitoring taps 500 can be placed in active cassette 100, and output to tap monitoring diagnostic equipment 502 with no related loss to the optical signal strength in the channel as it is compensated for directly within cassette 100 from which it is being collected. Normally such taps in or near prior art passive cassettes can range from 10% to as high as 50%.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A fiber optic channel comprising:
    a transmitting switch for transmitting an optical signal through a fiber optic channel;
    a first patch cable connecting said transmitting switch to a fiber infrastructure; and a second patch cable connecting said fiber infrastructure to a receiving switch, each of said first and second patch cables containing both a fiber optic channel and an electrical conductor, each of said patch cables also having at least one connector for arranging and aligning fibers of said fiber optic channel in said patch cable, wherein said fiber infrastructure has a trunk cable connecting two optical cassettes, and wherein at least one of said optical cassettes is an active fiber optic cassette configured to receive a first optical signal from an input connection, convert the first optical signal to an electrical signal, condition that electrical signal, convert the electrical signal into a second optical signal and transmit the second optical signal through an output connection, said input and output connections of the active optical cassette being able to be connected to one or more fiber optic connectors, said at least one connector also having a pair of connector guide pins assisting in the connection of said first and second patch cables to said two optical cassettes, said connector guide pins also connected to said electrical conductor within said patch cables, such that said at least one active cassettes in said fiber optic infrastructure are powered via an electrical connection between said first and/or second patch cables, passing through said pairs of fiber optic connector guide pins of fiber optic connectors in the connectors of said first and second patch cables.

2. The fiber optic channel as claimed in claim 1, wherein both of said optical cassettes in said fiber optic infrastructure are active cassettes.

3. The fiber optic channel as claimed in claim 1, wherein active cassette includes components of an optical transceiver, including but not limited to, TOSA/ROSA, CDR, MDI, laser diver, and receiver amplifiers.

4. The fiber optic channel as claimed in claim 1, wherein a tap is applied within the channel at the active cassette to monitor at least one of the optical pathways in the channel.

5. The fiber optic channel as claimed in claim 4, wherein said tap is tapped off an optical signal within said active cassette.

6. The fiber optic channel as claimed in claim 4, wherein said tap is tapped off an electrical signal within said active cassette.

7. The fiber optic channel as claimed in claim 1, further comprising a wireless antenna for transmitting diagnostic data.

8. The fiber optic channel as claimed in claim 7, wherein said active cassette further comprises an impedance element for collecting said diagnostic data, said diagnostic data being in the form of impedance variations in said first tandem patch cable.

* * * * *